(12) United States Patent
Brown et al.

(10) Patent No.: US 7,701,077 B2
(45) Date of Patent: Apr. 20, 2010

(54) SECONDARY POWER FOR CRITICAL LOADS FOR RAILROAD

(75) Inventors: Herbert Joseph Brown, Erie, PA (US); Jeffrey Louis Daigle, Erie, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 1253 days.

(21) Appl. No.: 11/183,368

(22) Filed: Jul. 17, 2005

(65) Prior Publication Data

US 2006/0025902 A1    Feb. 2, 2006

Related U.S. Application Data

(60) Provisional application No. 60/590,496, filed on Jul. 23, 2004.

(51) Int. Cl.
  *B60L 1/00* (2006.01)
  *H02J 7/00* (2006.01)
(52) U.S. Cl. .................................. 307/9.1; 307/64
(58) Field of Classification Search ............. 307/9.1, 307/10.1, 64
  See application file for complete search history.

(56) References Cited

U.S. PATENT DOCUMENTS 5,347,191 A * 9/1994 Wood .................... 310/113
6,591,758 B2 * 7/2003 Kumar ................... 105/35
7,057,376 B2 * 6/2006 Cook et al. .............. 323/207

\* cited by examiner

*Primary Examiner*—Jared J Fureman
*Assistant Examiner*—Michael Rutland Wallis
(74) *Attorney, Agent, or Firm*—GE Global Patent Operation; John A. Kramer

(57) ABSTRACT

In a locomotive having at least one electrical load connected to at least one power source via a locomotive power carrying bus, a system for ensuring a current connection between the at least one power source and the at least one electrical load is provided. The system includes a first rectification device, wherein the first rectification device is connected between the at least one electrical load and the locomotive power carrying bus to provide a rectified current connection between a first power source and the at least one electrical load. The system further includes a second rectification device, wherein the second rectification device is connected between the at least one electrical load and the locomotive power carrying bus to provide a current connection between a second power source and the at least one electrical load and at least one auxiliary rectification device, wherein the at least one auxiliary rectification device is connected to the at least one electrical load and at least one of the first rectification device and the second rectification device to ensure a continuous current connection between the at least one power source and the at least one electrical load.

4 Claims, 14 Drawing Sheets

*Auxiliary Voltage Trainline*

Battery Charger Trainline with wayside

Battery Charger Trainline with wayside alternative

Battery Trainline

Auxiliary Voltage Trainline

Auxiliary Power Unit (APU)

Auxiliary Power Unit (APU) Trainline

Auxiliary Power Unit (APU) w/DC Charger Trainline

Auxiliary Power Unit (APU) w/Battery DC Trainline

*Traction Inverter Backup*

*Alternative Traction Inverter Backup*

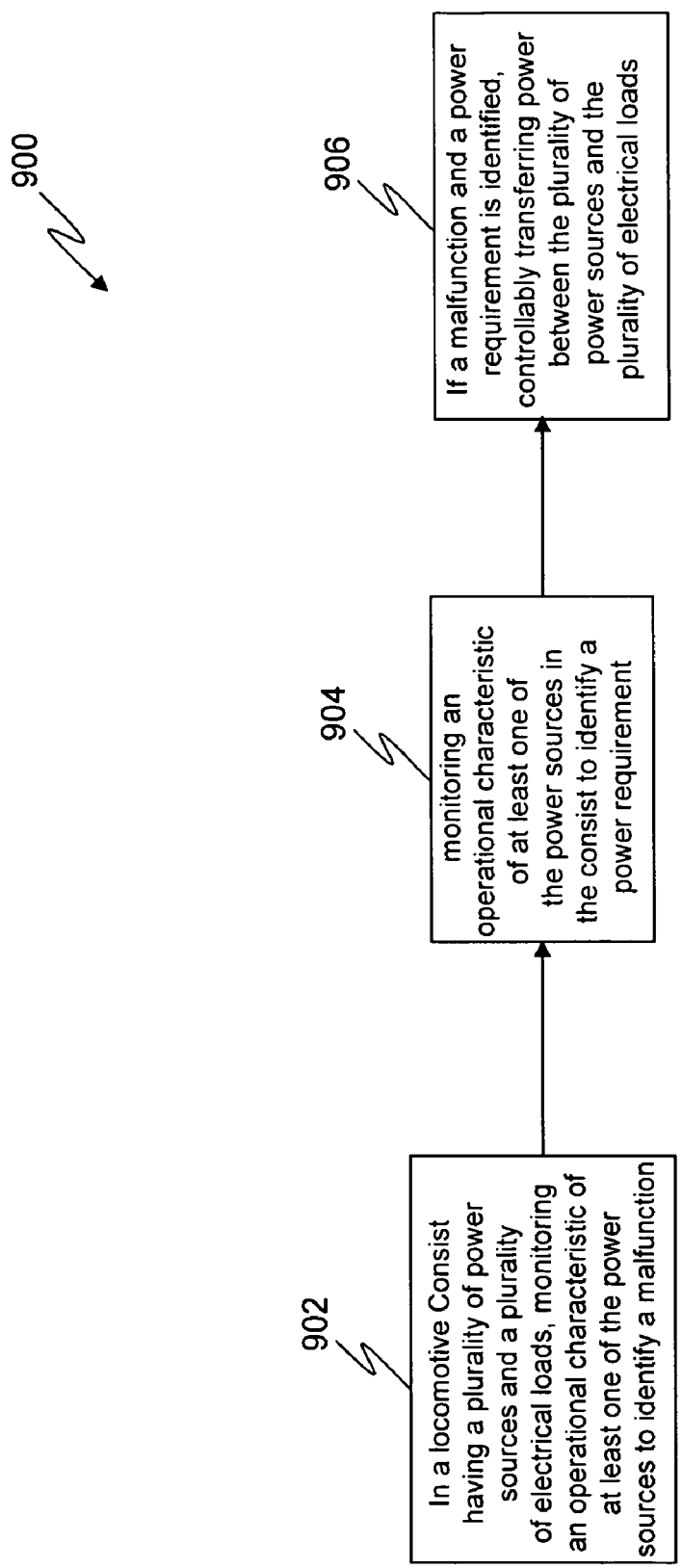

SECONDARY POWER FOR CRITICAL LOADS FOR RAILROAD

RELATED APPLICATIONS

This application claims priority of U.S. Provisional Patent Application Ser. No. 60/590,496 filed Jul. 23, 2004, the contents of which are incorporated herein by reference in its entirety.

FIELD OF THE INVENTION

The present invention relates generally to powering locomotives and more particularly to a method for providing power to critical locomotive systems in extreme environmental conditions.

BACKGROUND OF THE INVENTION

Locomotives that are used for heavy haul applications are well known and typically operate in extreme environmental conditions, including sub-freezing temperatures and/or high altitudes. As such, these locomotives must provide critical life support systems, such as heating devices and/or oxygen generation devices, to the operator(s) of these locomotives. If any of these critical systems fail or are taken offline for any reason, the operator(s) must be able to survive and/or be comfortable until assistance arrives.

Unfortunately however, current locomotive electrical system designs only provide for some critical systems being connected to a battery while other critical systems (such as heating devices and oxygen generation devices) are connected to the output of the battery charger. This is because these loads are high compared to the battery capacity. As such, these critical systems are isolated from the battery via a diode to prevent these systems from discharging the battery, as shown in FIG. 1. Currently, the only battery level power connection existing between locomotives are the train-lines which are used for control applications and are not capable of supplying power.

As such, if the locomotive fails to operate and ceases to supply power to the critical systems, such as the heating device and/or the oxygen generating device, then these critical systems will fail to function. This is undesirable because if the critical systems, such as the heating device and/or oxygen generating device, fails during operation in these environmental conditions, the locomotive operator will be exposed to sub-freezing temperatures and low oxygen levels, thus risking serious injury including hypothermia and frost bite or even death.

SUMMARY OF THE INVENTION

In a locomotive having at least one electrical load connected to at least one power source via a locomotive power carrying bus, a system for ensuring a current connection between the at least one power source and the at least one electrical load is provided. The system includes a first rectification device, wherein the first rectification device is connected between the at least one electrical load and the locomotive power carrying bus to provide a rectified current connection between a first power source and the at least one electrical load. The system further includes a second rectification device, wherein the second rectification device is connected between the at least one electrical load and the locomotive power carrying bus to provide a current connection between a second power source and the at least one electrical load and at least one auxiliary rectification device, wherein the at least one auxiliary rectification device is connected to the at least one electrical load and at least one of the first rectification device and the second rectification device to ensure a continuous current connection between the at least one power source and the at least one electrical load.

In a locomotive consist having at least two locomotives electrically connected via a train-line power bus, wherein each of the two locomotives includes a locomotive power carrying bus and at least one electrical load connected to at least one power source via at least one current rectification device connected to the locomotive power carrying bus, a system for ensuring a rectified current connection between the at least one power source and the at least one electrical load is provided. The system includes a first rectification device, wherein the first rectification device is connected between the at least one electrical load and the locomotive power carrying bus to provide a rectified current connection between a first power source and the at least one electrical load. The system further includes a second rectification device, wherein the second rectification device is connected between the at least one electrical load and the locomotive power carrying bus to provide a rectified current connection between a second power source and the at least one electrical load and at least one auxiliary rectification device, wherein the at least one auxiliary rectification device is connected to the at least one electrical load and at least one of the first rectification device and the second rectification device to ensure a rectified current connection between the at least one power source and the at least one electrical load.

In a locomotive consist having a first locomotive and a second locomotive, wherein the first locomotive includes a first locomotive power source connected to a first locomotive electrical load and wherein the second locomotive includes a second locomotive power source connected to a second locomotive electrical load and wherein the first locomotive electrical load is electrically connected to the second locomotive electrical load via a train-line power bus, a method for allowing the first locomotive to controllably and electrically interact with the second locomotive is provided. The method includes monitoring an operational characteristic of at least one of the first locomotive power source and the second locomotive power source to identify a malfunction of at least one of the first locomotive power source and the second locomotive power source and to identify a power requirement from at least one of the first locomotive electrical load and the second locomotive electrical load and, if a malfunction of at least one of the first locomotive power source and the second locomotive power source is identified and a power requirement from at least one of the first locomotive electrical load and the second locomotive electrical is identified, controllably transferring power from at least one of the first locomotive power source and the second locomotive power source to at least one of the first locomotive electrical load and the second locomotive electrical via the train-line power carrying bus.

BRIEF DESCRIPTION OF THE FIGURES

The foregoing and other features and advantages of the present invention will be more fully understood from the following detailed description of illustrative embodiments, taken in conjunction with the accompanying drawings in which like elements are numbered alike in the several Figures:

FIG. 14 is a block diagram illustrating a method for allowing a first locomotive to controllably and electrically interact with a second locomotive.

DETAILED DESCRIPTION OF THE INVENTION

Generally, a device for allowing high current connections to be made to a locomotive's power carrying bus is provided, including, but not limited to, a locomotive auxiliary bus and a DC battery bus.

Figure 1:
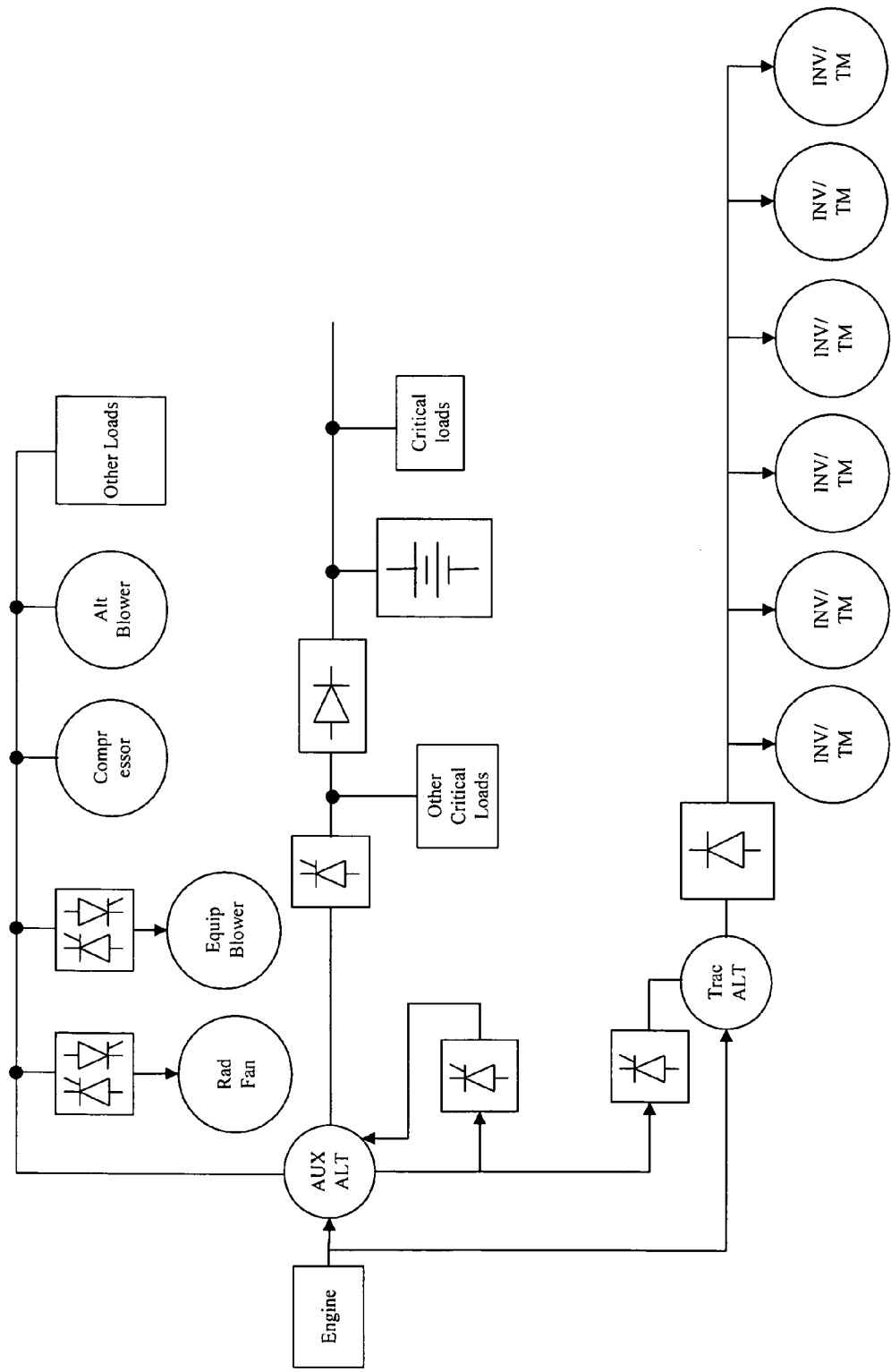
FIG. 1 is a block diagram illustrating a locomotive electrical system configuration, in accordance with the prior art.
Figure 2:
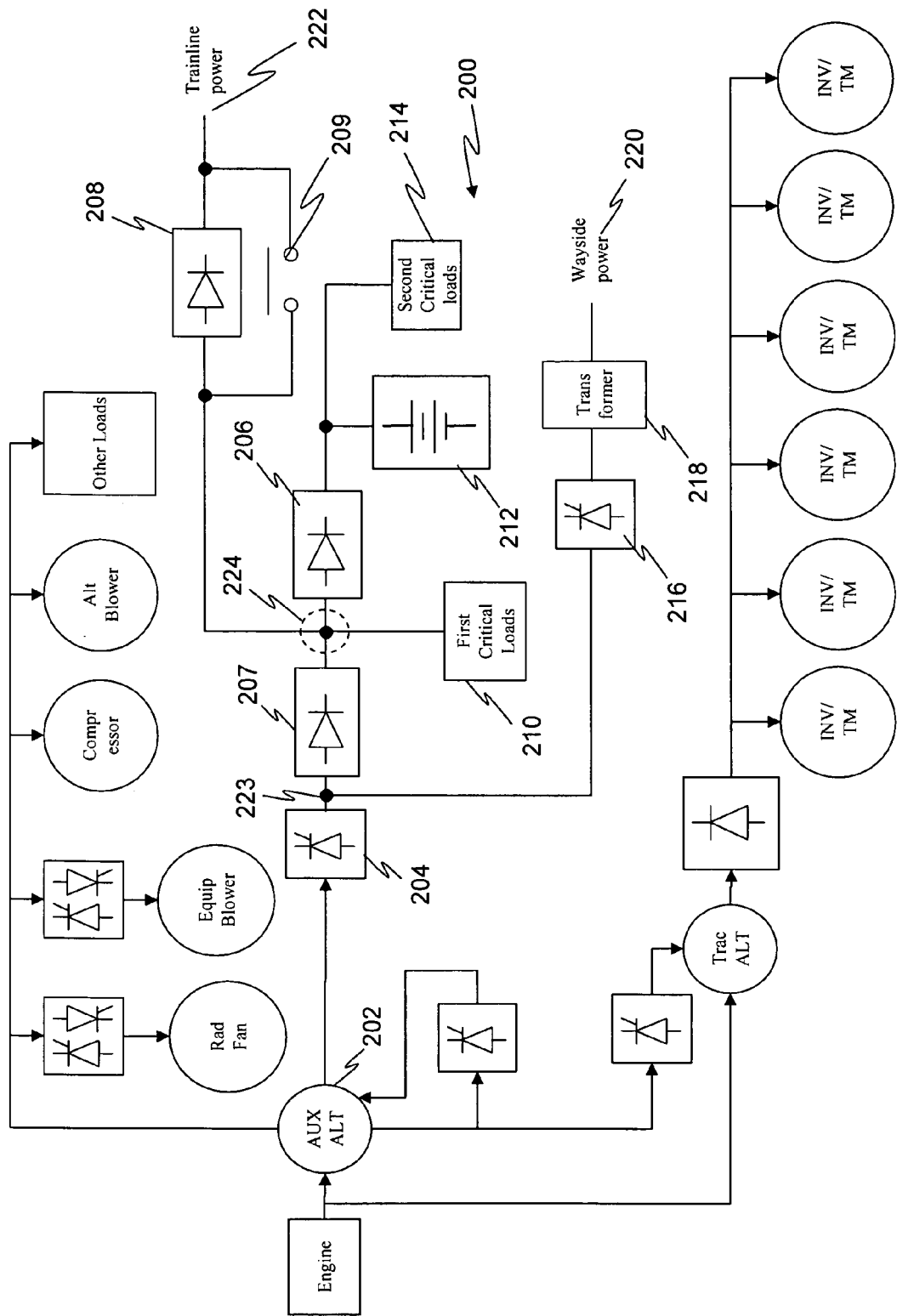
FIG. 2 is a schematic block diagram illustrating a locomotive electrical system configuration, in accordance with a first embodiment.

Referring to FIG. 2, a first embodiment of a device 200 for allowing a high current connection to be made to a locomotive's power carrying bus, in this embodiment a Battery Charger Trainline, is shown and includes an auxiliary power source 202, a first phase controlled rectifying device 204, a first diode 206, a second diode 208, a third diode 207, a contactor device 209, a first critical load 210, a battery source 212, a second critical load 214, a second phase controlled rectifying device 216, a transformer 218, a wayside power connection 220 and a trainline power connection 222. As can be seen the first phase controlled rectifying device 204, the third diode 207 and the second phase controlled rectifying device 216 are connected with each other via a first common node 223, wherein the auxiliary power source 202 and the wayside power source 220 are communicated with the first common node 223 via the first phase controlled rectifying device 204 and the second phase controlled rectifying device 216, respectively. Additionally, the third diode 207, the first diode 206, the second diode 208 and the first critical load 210 are connected with each other via a second common node 224, wherein the trainline power connection 222 is communicated with the second common node 224 via the contactor device 209 and the second diode 208, wherein the contactor device 209 and the second diode 208 are associated with each other via a parallel configuration. Moreover, the battery source 212 and the second critical load 214 are communicated with the second common node 224 via the first diode 206.

As shown in FIG. 2, trainline power is supplied to device 200 via trainline power connection 222, wherein during normal operation contactor device 209 is open and power flow between locomotives is prevented by second diode 208. However, when a locomotive engine, auxiliary alternator and/or battery charging system fails, the contactor device 209 closes allowing any other locomotive in the locomotive consist to supply power to the first critical load 210 via the second diode 208 (of the other unit) and to the second critical load 214 via second diode 208 (of the other unit) and the first diode 206. It should be appreciated that second diode 208 not only prevents power flow between locomotives during normal operation, but also allows the device 200 to be in a 'standby' mode to supply power to any other locomotive(s) on the trainline that needs power. The device 200 may include both the second diode 208 and the contactor device 209 or the device 200 may include only one of the second diode 208 and the contactor device 209. As such, the second diode 208 and the contactor device 209 may be separately optional, wherein if only the diode 208 is provided then these locomotives may supply power and if only the contactor device 209 is provided then those locomotives may supply and receive power. It should be appreciated that other components and configurations suitable to the desired end purpose may be used. For example, filter reactors, capacitors, current sensors, voltage sensors, fuses, circuit breakers and other monitoring and protection devices may be used as well in various configurations.

Furthermore, operation of the contactor device 209 may be remotely controlled, manually controlled (i.e. operator intervention) and/or controlled via a processing device and/or control logic. It should be appreciated that the trainline power may be actively limited via the first phase controlled rectifying device 204 and if wayside power is available via the wayside power connection 220 (or any other suitable delivery device and/or method), then wayside power may be connected with the first critical load 210 via the transformer 218, the second phase controlled rectifying device 216 and the third diode 207 and wayside power may be connected with the second critical load 214 via the transformer 218, the second phase controlled rectifying device 216, the third diode 207 and the first diode 206. It should be appreciated that only one phase controlled rectifying device may be used in place of the first phase controlled rectifying device 204 and the second phase controlled rectifying device 216 as long as the device 200 includes switching capability to allow the one phase controlled rectifying device to connect to the desired voltage source. Additionally, although the embodiments disclosed herein are shown as being implemented with phase controlled rectifying devices, any type of rectifying devices and/or signal processing devices suitable to the desired end purpose may be used. Moreover, transformer 218 may or may not be required to provide isolation and/or power factor improvement/correction.

Figure 3:
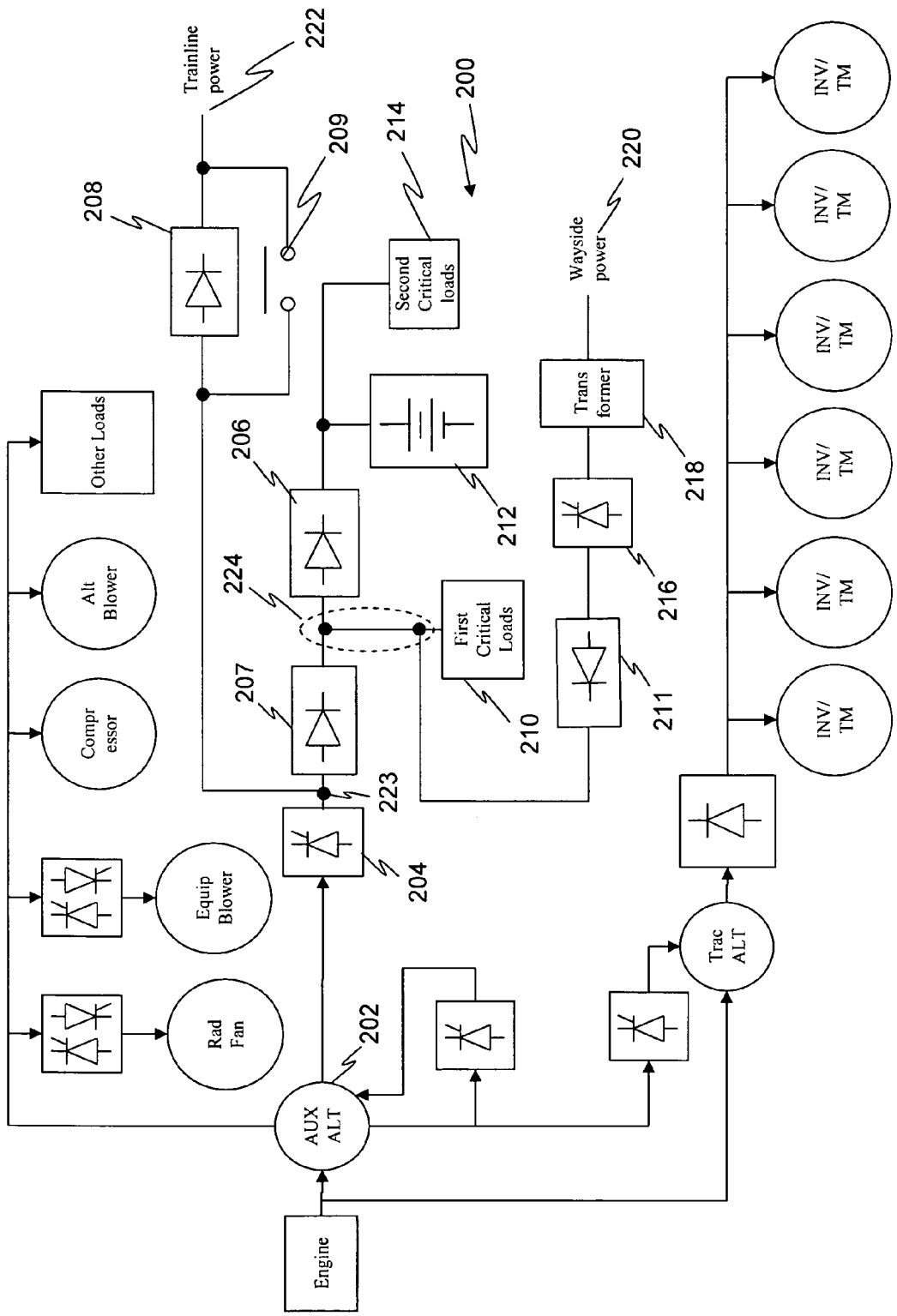
FIG. 3 is a schematic block diagram illustrating a locomotive electrical system configuration, in accordance with a second embodiment.

Referring to FIG. 3, second embodiment of a device 200 for allowing a high current connection to be made to a locomotive's power carrying bus, is shown and includes a third diode 207 and a fourth diode 208. The second embodiment of the device 200 is similar to the first embodiment of the device 200 with the exception that the wayside power may be connected with the first critical load 210 via the transformer 218, the second phase controlled rectifying device 216 and a fourth diode 211 connected to the second common node 224 and wayside power may be connected with the second critical load 214 via the transformer 218, the second phase controlled rectifying device 216, the fourth diode 211 and the first diode 206. Additionally, the trainline power 222 may be connected with the first critical load 210 via the third diode 207 and the second critical load 214 via the third diode 207 the first diode 206.

Figure 4:
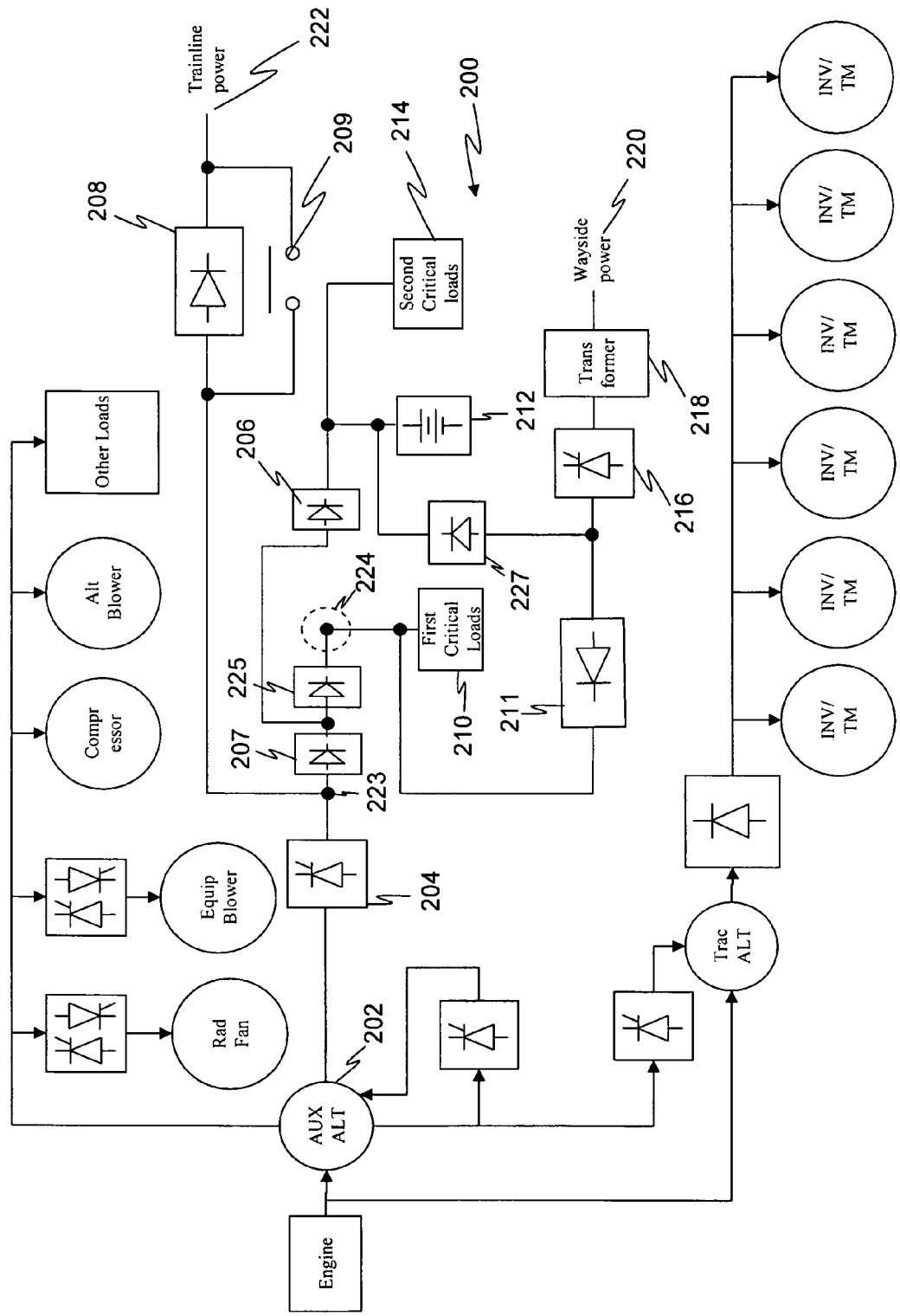
FIG. 4 is a schematic block diagram illustrating a locomotive electrical system configuration, in accordance with a third embodiment.

Referring to FIG. 4, a third embodiment of a device 200 for allowing a high current connection to be made to a locomotive's power carrying bus, is shown and includes a third diode 207, a fourth diode 211, a fifth diode 225 and a sixth diode 227. The third embodiment of the device 200 is similar to the second embodiment of the device 200 with the exception that the wayside power 220 is connected with the first critical load 210 via the transformer 218, the second phase controlled rectifying device 216 and a fourth diode 211 connected to the second common node 224 and the wayside power 220 may be connected with the second critical load 214 via the transformer 218, the second phase controlled rectifying device 216 and a sixth diode 225. Moreover, the trainline power 222 may be connected with the first critical load 210 via the third diode 207 and the fifth diode 225 and the trainline power 222 may be connected with the second critical load 214 via the third diode 207 and the first diode 206.

Figure 5:
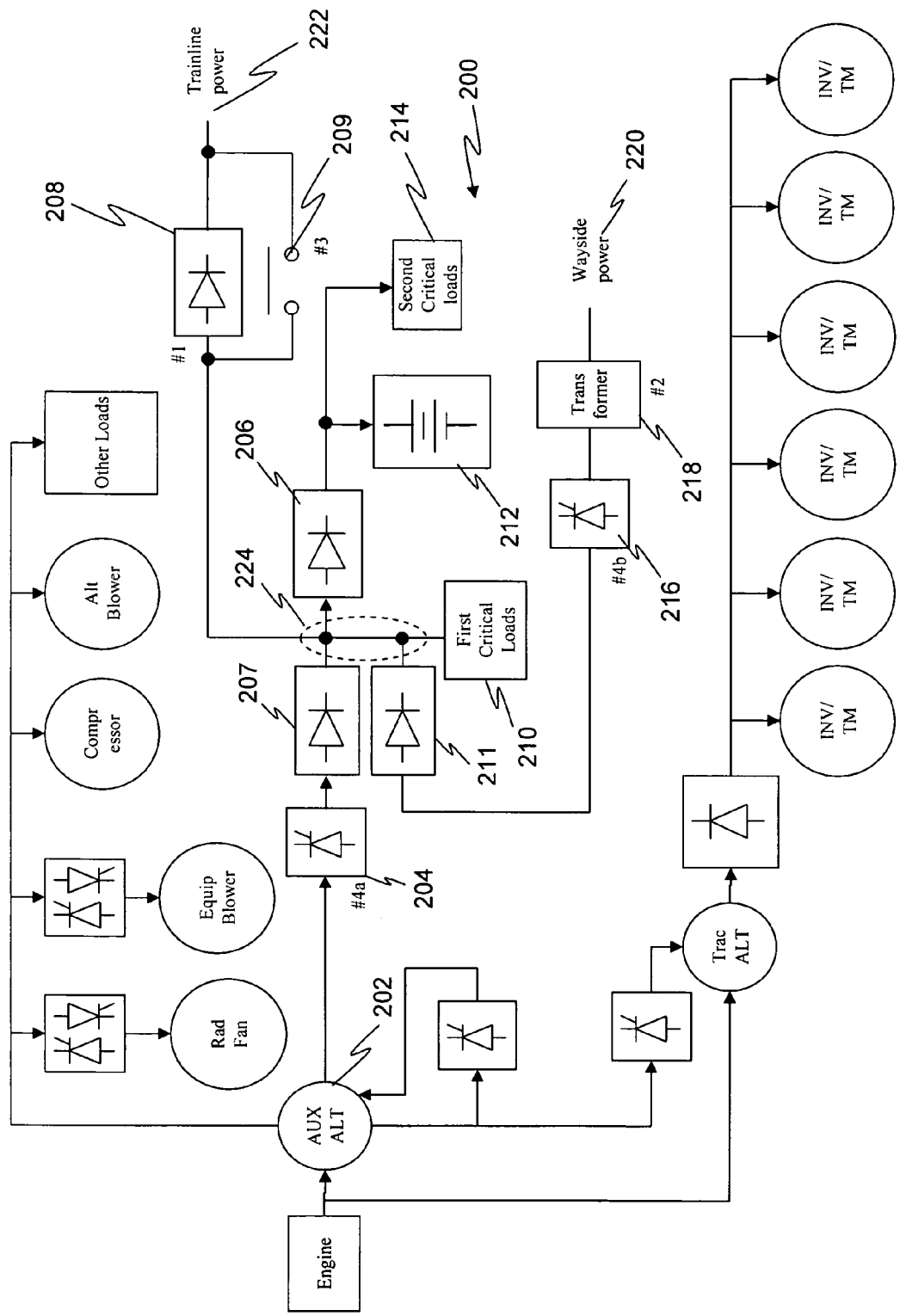
FIG. 5 is a schematic block diagram illustrating a locomotive electrical system configuration, in accordance with a second embodiment.

Referring to FIG. 5, a fourth embodiment of a device 200 for allowing a high current connection to be made to a locomotive's power carrying bus, is shown and includes a third diode 207 and a fourth diode 208. The fourth embodiment of the device 200 is similar to the first embodiment of the device 200 with the exception that the wayside power is connected with the first critical load 210 via the transformer 218, the second phase controlled rectifying device 216 and a fourth diode 211 connected to the second common node 224 and wayside power may be connected with the second critical load 214 via the transformer 218, the second phase controlled rectifying device 216, the fourth diode 211 and the first diode 206.

Figure 6:
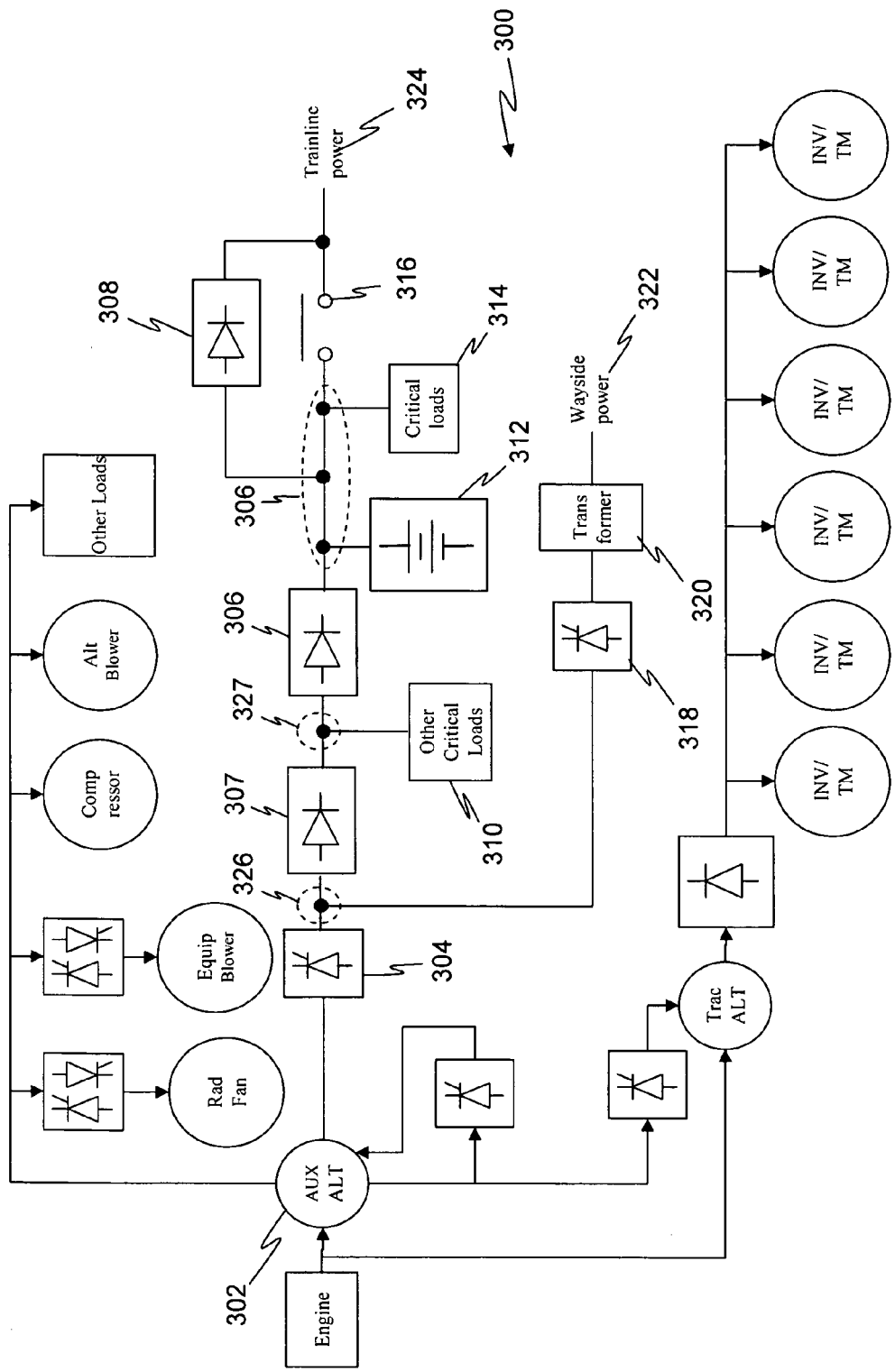
FIG. 6 is a schematic block diagram illustrating a locomotive electrical system configuration, in accordance with a third embodiment.

Referring to FIG. 6, a fifth embodiment of a device 300 for allowing high current connections to be made to a locomotive's power carrying bus (Battery Trainline) is shown and includes an auxiliary power source 302, a first phase controlled rectifying device 304, a first diode 306, a second diode 308, a third diode 307, a first critical load 310, a battery source 312, a second critical load 314, a contactor device 316, a second phase controlled rectifying device 318, a transformer 320, a wayside power connection 322 and a trainline power connection 324. As shown, the first phase controlled rectifying device 304, third diode 307 and the second phase controlled rectifying device 318 are connected with each other via a first common node 326, wherein the third diode 307 and the first diode 306 are connected to the first critical load 310 via a second common node 327. Additionally, the auxiliary power source 302 is communicated with the first common node 326 via the first phase controlled rectifying device 304. Also as shown, the second diode 308, the battery source 312, the first diode 306, the second critical load 314 and the contactor device 316 are communicated with each other via a third common node 328, wherein the second diode 308 and the contactor device 316 are further communicated with the trainline power connection 324 in a parallel fashion with each other. Furthermore, the wayside power connection 322 is connected with the transformer 320 which in turn is communicated with the first common node 326 via the second phase controlled rectifying device 318.

The battery bus may be trainlined to other locomotives and their associated critical loads through a diode and contactor disposed in parallel combination, similar to the configuration that the second diode 308 and the contactor 316 are shown. Moreover, in some situations only critical loads connected to the battery may be supplied with power from another power source, such as a locomotive. Also, the device 300 may include both the second diode 308 and the contactor device 316 or the device 300 may include only one of the second diode 308 and the contactor device 316. As such, the second diode 308 and the contactor device 316 may be separately optional. Furthermore, it should be appreciated that only one phase controlled rectifying device may be used in place of first phase controlled rectifying device 304 and second phase controlled rectifying device 312 as long as device 300 includes switching capability to allow the one phase controlled rectifying device to connect to the desired voltage source. Moreover, the transformer 320 may or may not be required to provide isolation and/or power factor improvement/correction.

Figure 7:
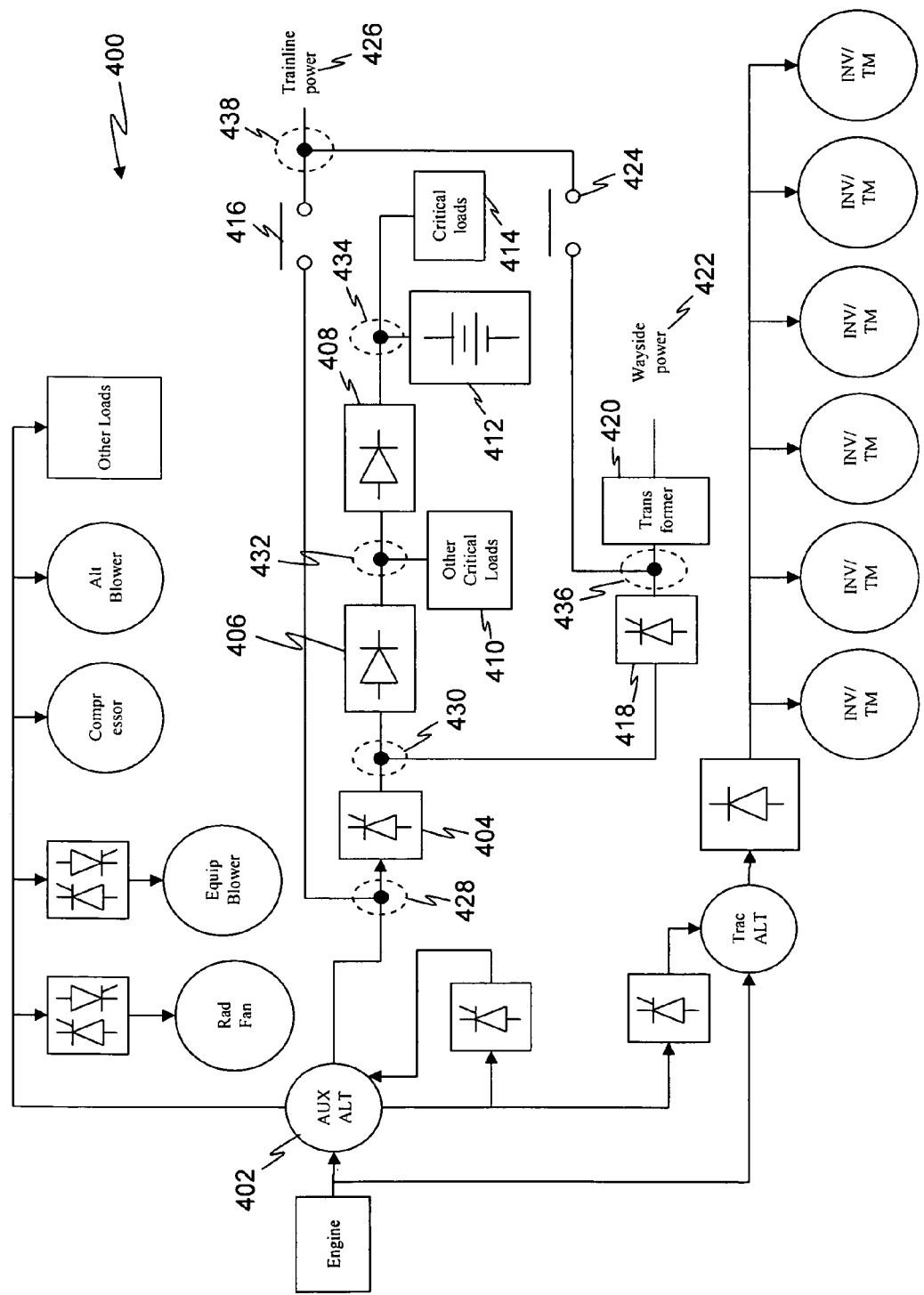
FIG. 7 is a schematic block diagram illustrating a locomotive electrical system configuration, in accordance with a fourth embodiment.

Referring to FIG. 7, a sixth embodiment of a device 400 for allowing high current connections to be made to a locomotive's power carrying bus (Auxiliary Voltage Trainline) is shown and includes an auxiliary power source 402, a first phase controlled rectifying device 404, a first diode 406, a second diode 408, a first critical load 410, a battery source 412, a second critical load 414, a first contactor device 416, a second phase controlled rectifying device 418, a transformer 420, a wayside power connection 422, a second contactor device 424 and a trainline power source 426. As shown, the first phase controlled rectifying device 404 and the first contactor device 416 are connected with the auxiliary power source 402 via a first common node 428. Additionally, the first phase controlled rectifying device 404, the first diode 406 and the second phase controlled rectifying device 418 are communicated with each other via a second common node 430, wherein the first diode 406 is further connected with the first critical load 410 and the second diode 408 via a third common node 432. The second diode 408 is further connected to the battery source 412 and the second critical load 414 via a fourth common node 434. Moreover, the second phase controlled rectifying device 418 is connected with the transformer 420 and the second contactor device 424 via a fifth common node 436, wherein the first contactor device 416 and the second contactor device 424 are connected with the trainline power source 426 via a sixth common node 438.

In FIG. 7, it should be appreciated that although the battery charger AC source is shown as being trainlined to other locomotives and their associated critical loads, this trainline could have been from other AC sources available, such as the auxiliary motor winding source, or the auxiliary excitation source or the traction alternator source, depending on the capability of the equipment. Moreover, it should be further appreciated that the wayside power connection 422 may also be trainlined. However, a transformer may be needed to convert some or all of these sources to appropriate voltage levels and/or to provide isolation and/or power factor improvement/correction. Furthermore, only one phase controlled rectifying device may be used in place of the first phase controlled rectifying device 404 and second phase controlled rectifying device 418 as long as the device 400 includes the switching capability necessary to allow the phase controlled rectifying device to connect to the desired voltage source. Additionally, the transformer 420 may or may not be required to provide isolation and/or power factor improvement/correction.

Figure 8:
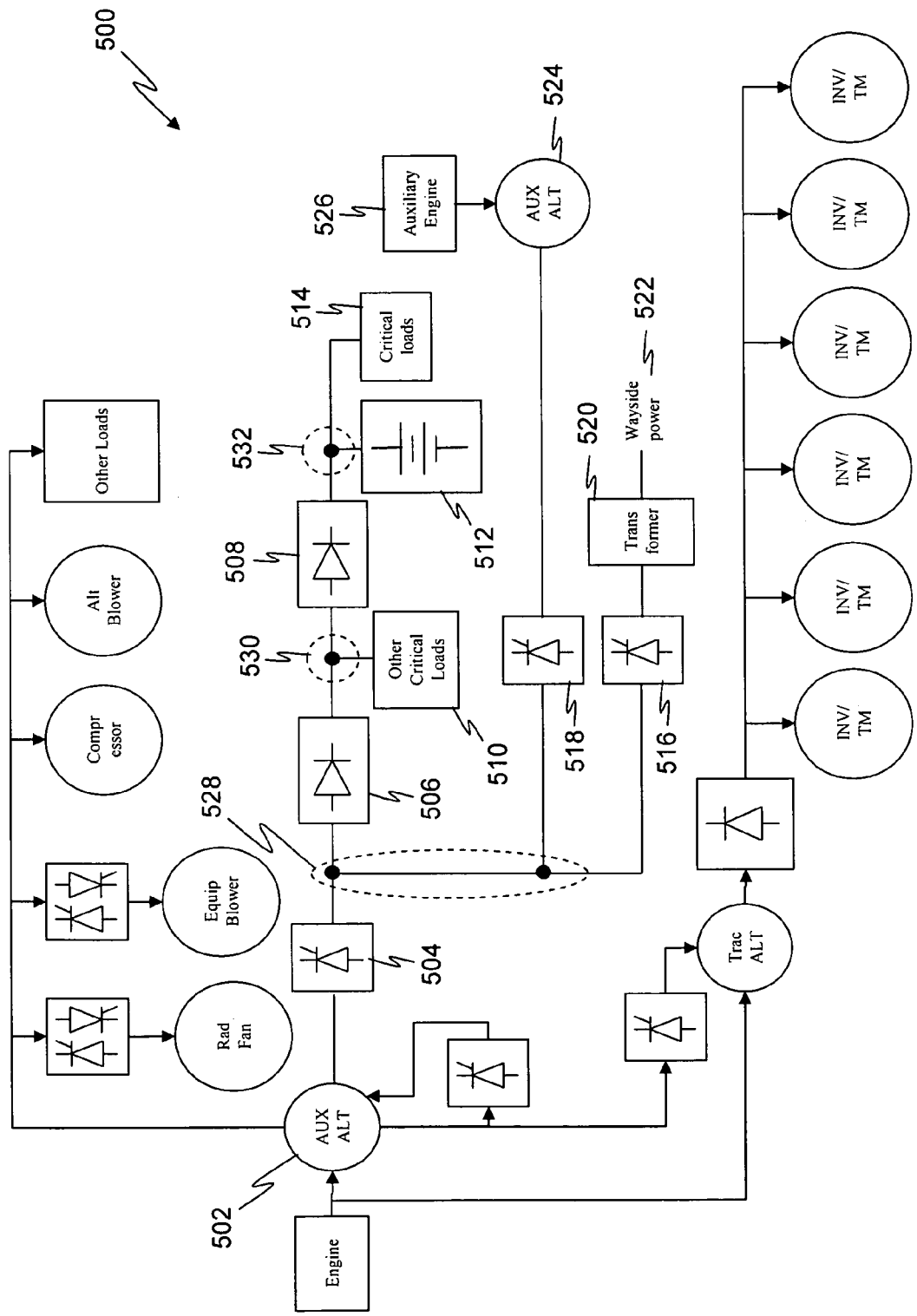
FIG. 8 is a schematic block diagram illustrating a locomotive electrical system configuration, in accordance with a fifth embodiment.

Referring to FIG. 8, a seventh embodiment of a device 500 for allowing high current connections to be made to a locomotive's power carrying bus is shown and includes a first auxiliary power source (Auxiliary Power Unit (APU)) 502, a first phase controlled rectifying device 504, a first diode 506, a second diode 508, a first critical load 510, a battery source 512, a second critical load 514, a second phase controlled rectifying device 516, a third phase controlled rectifying device 518, a transformer 520, a wayside power connection 522 and a second auxiliary power source 524 connected to an auxiliary engine 526. As shown, the first auxiliary power source 502 is connected with the first phase controlled rectifying device 504 which in turn is communicated with the first diode 506, the second phase controlled rectifying device 516 and the third phase controlled rectifying device 518 via a first common node 528. The first diode 506 is further connected with the first critical load 508 and the second diode 508 via a second common node 530, wherein the second diode 508 is further communicated with the battery source 512 and the second critical load 514 via a third common node 532. Furthermore, the wayside power connection 522 is connected with the transformer 520 which in turn is communicated with the second phase controlled rectifying device 516. Additionally, the third phase controlled rectifying device 518 is further communicated with the second auxiliary power source 524 which is connected to the auxiliary engine 526.

In FIG. 8, it should be appreciated that the APU device 500 may be used as a stand-alone auxiliary power source or may be added to provide an additional source of power to the first critical load 510 and/or the second critical load 514. Moreover, as shown in FIG. 8 6, the backup system may be disposed on board the locomotive and may or may not depend on other loads which also may be trainlined. It should be further appreciated that single and/or multiple phase controlled rectifying device(s) may be used in place of the first phase controlled rectifying device 504, the second phase controlled rectifying device 516 and/or the third phase controlled rectifying device 518 as long as the APU device 500 includes the switching capability necessary to allow the single and/or multiple phase controlled rectifying device(s) to connect to the desired voltage source(s).

Figure 9:
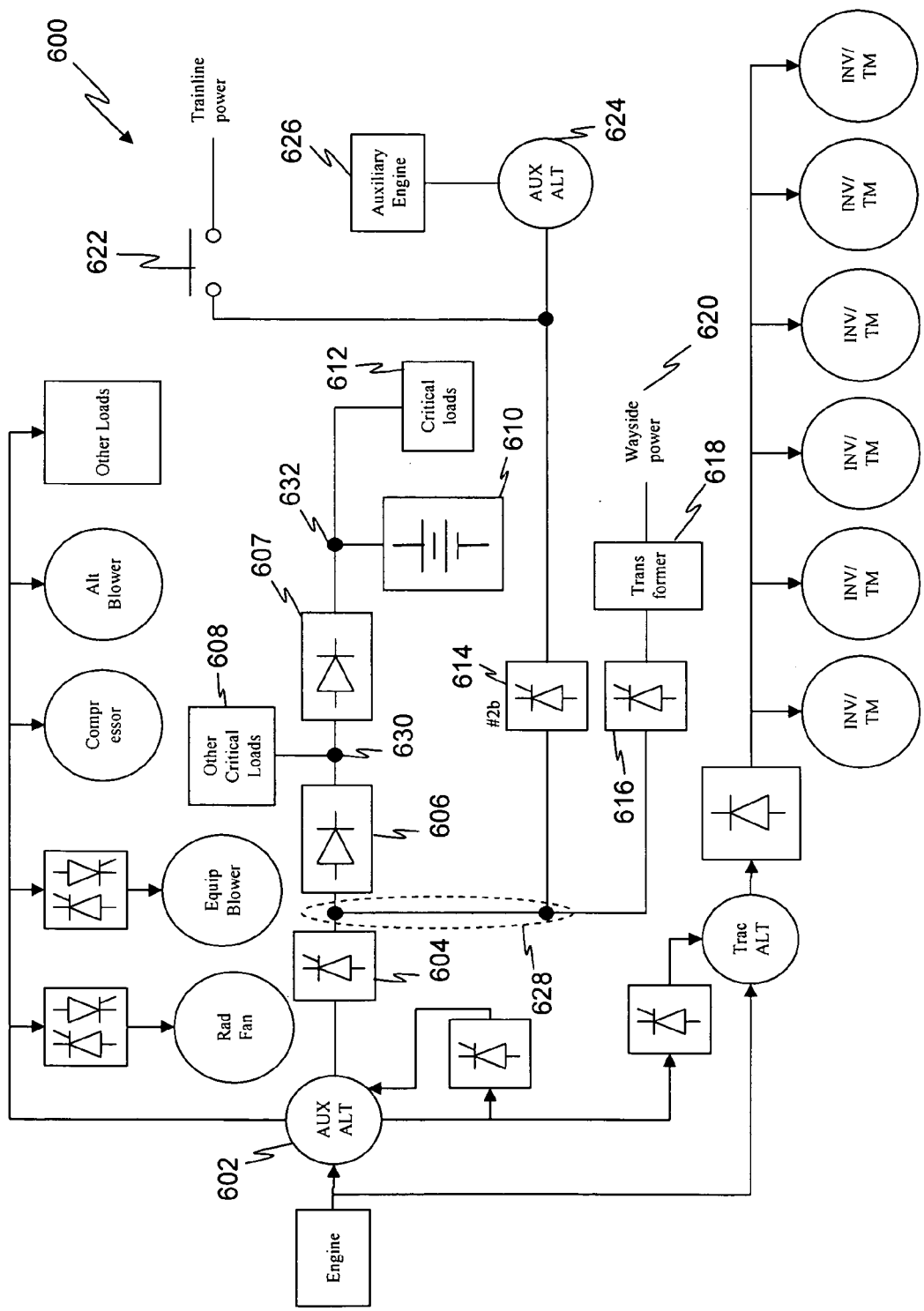
FIG. 9 is a schematic block diagram illustrating a locomotive electrical system configuration, in accordance with a sixth embodiment.

Referring to FIG. 9, an eighth embodiment of a device 600 for allowing high current connections to be made to a locomotive's power carrying bus (Auxiliary Power Unit (APU) Trainline) is shown and includes a first auxiliary power source 602, a first phase controlled rectifying device 604, a first diode 606, a second diode 607, a first critical load 608, a battery source 610, a second critical load 612, a second phase controlled rectifying device 614, a third phase controlled rectifying device 616, a transformer 618, a wayside power connection 620, a contactor device 622 and a second auxiliary power source 624, wherein the contactor device 622 and the second auxiliary power source 624 are connected to the second phase controlled rectifying device 614 and wherein the second auxiliary power source 624 is further connected to an auxiliary engine 526. As shown, the first auxiliary power source 602 is connected with the first phase controlled rectifying device 604 which in turn is communicated with the first diode 606, the second phase controlled rectifying device 614 and the third phase controlled rectifying device 616 via a first common node 628, wherein the first diode 606 is further connected with the first critical load 608 and the second diode 607 via a second common node 630. The second diode 607 is further connected with the battery source 610 and second critical load 612 via a third common node 632. Furthermore, the wayside power connection 620 is connected with transformer 618 which in turn is communicated with third phase controlled rectifying device 616.

In FIG. 9, it should be appreciated that the APU device 600 may be used as a stand-alone auxiliary power source, may be added to provide an additional source of power to the first critical load 608 and/or the second critical load 612 and/or may be sourced to other locomotives in the consist and their associated critical loads. Moreover, single or multiple phase controlled rectifying device(s) may be used in place of the first phase controlled rectifying device 604, the second phase controlled rectifying device 614 and/or the third controlled rectifying device 616 as long as the APU device 600 includes the switching capability necessary to allow the single and/or multiple phase controlled rectifying device(s) to connect to the desired voltage source(s). Furthermore, the transformer 618 may or may not be required to provide isolation and/or power factor improvement/correction and a contactor may be provided between the second auxiliary power source 624 and the contactor device 622 so that if the second auxiliary power source 624 fails, the second auxiliary power source 624 does not short the trainline power.

Figure 10:
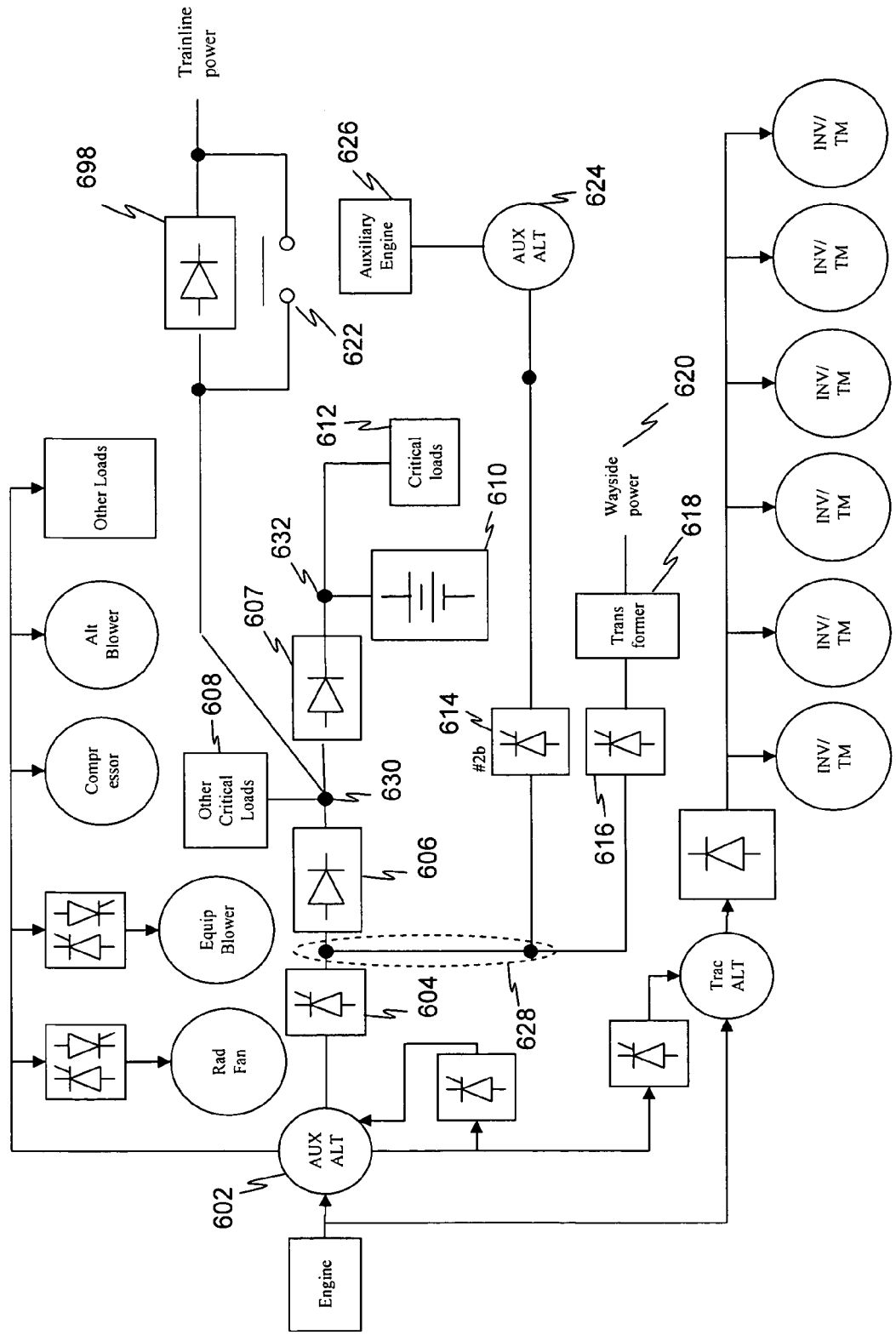
FIG. 10 is a schematic block diagram illustrating a locomotive electrical system configuration, in accordance with a seventh embodiment.
Figure 11:
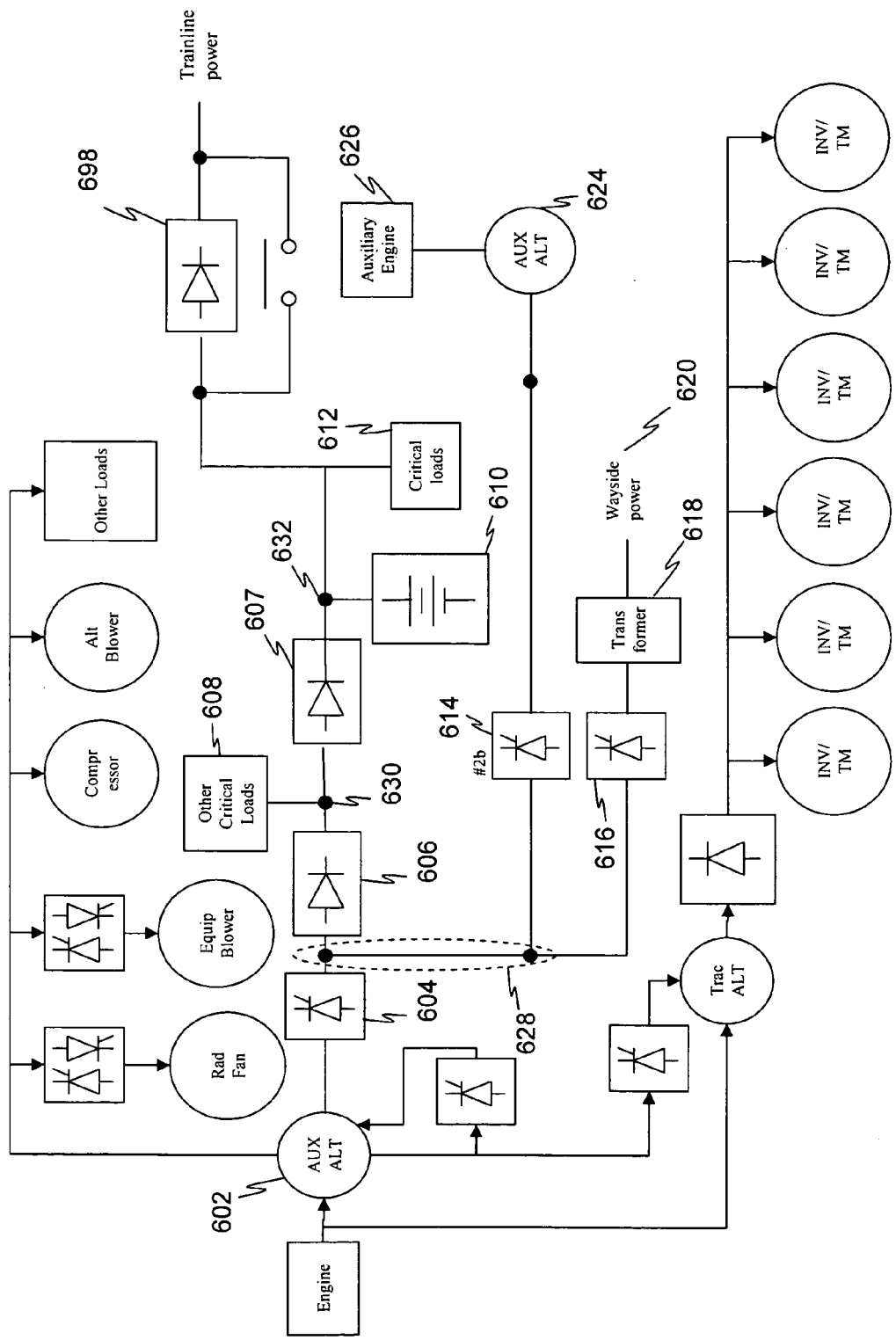
FIG. 11 is a schematic block diagram illustrating a locomotive electrical system configuration, in accordance with an eighth embodiment.

Referring to FIG. 10, ninth embodiment of a device 600 for allowing a high current connection to be made to a locomotive's power carrying bus, is shown and is similar to the eighth embodiment with the exception of the trainline power being connected with the first critical load 612 via second diode 607 and a third diode 698 disposed in parallel with contactor device 622 and the trainline power being connected with the other critical loads 608 via the third diode 698 disposed in parallel with contactor device 622. Moreover, referring to FIG. 11, a tenth embodiment of a device 600 for allowing a high current connection to be made to a locomotive's power carrying bus, is shown and is similar to the ninth embodiment with the exception of the trainline power being connected with the first critical load 612 via a third diode 698 disposed in parallel with contactor device 622.

Figure 12:
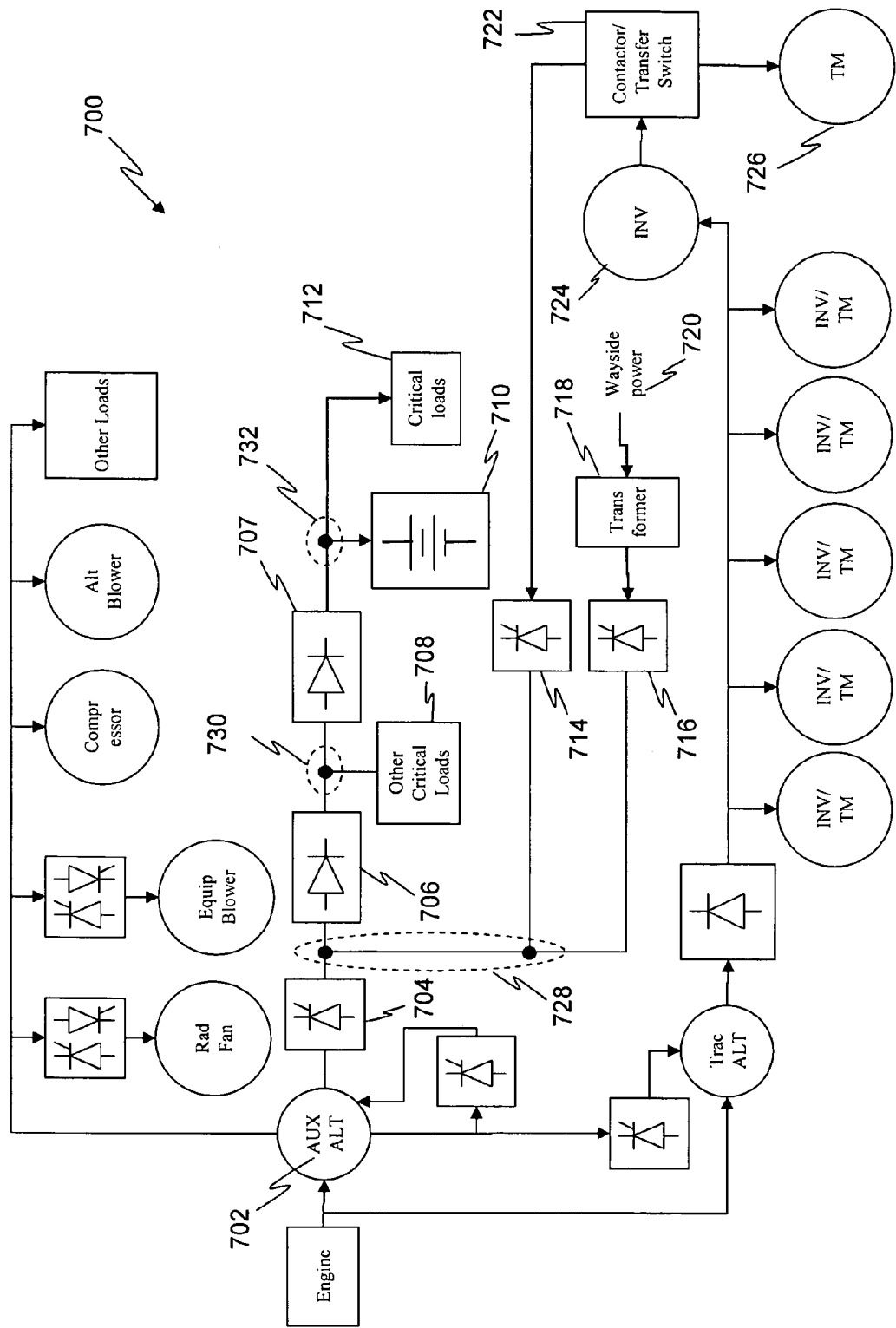
FIG. 12 is a schematic block diagram illustrating a locomotive electrical system configuration, in accordance with a seventh embodiment.

Referring to FIG. 12, an eleventh embodiment of a device 700 for allowing high current connections to be made to a locomotive's power carrying bus (Traction Inverter Backup) is shown and includes a first auxiliary power source 702, a first phase controlled rectifying device 704, a first diode 706, a second diode 707, a first critical load 708, a battery source 710, a second critical load 712, a second phase controlled rectifying device 714, a third phase controlled rectifying device 716, a transformer 718, a wayside power connection 720 and a contactor/transfer switching device 722, wherein the contactor/transfer switching device 722 is further communicated with a traction inverter 724 and/or a traction motor 726. As shown, the auxiliary power source 702 is connected with the first phase controlled rectifying device 704 which is in turn communicated with the first diode 706, the second phase controlled rectifying device 714 and the third phase controlled rectifying device 716 via a first common node 728, wherein the first diode 706 is further communicated with the second diode 707 and the first critical load 708 via a second common node 730. Further more, the second diode 707 is further connected with the battery source 710 and the second critical load 712 via a third common node 732. Additionally, the wayside power connection 720 is connected with the transformer 718 which in turn is communicated with the third phase controlled rectifying device 716. Moreover, the second phase controlled rectifying device 714 is further communicated with the contactor/transfer switching device 722 which is communicated with the traction inverter 724 and/or traction motor 726.

It should be appreciated that the device of FIG. 12 may be used to back up a battery charger by disconnecting the traction inverter from the traction motor and connecting the traction inverter to a critical load via a phase controlled rectifier. Alternatively, an AC voltage may be supplied via a dedicated traction inverter in addition to or in place of an existing traction inverter. It should also be appreciated that a transformer/filter may be used to provide isolation and/or power factor improvement/correction.

Figure 13:
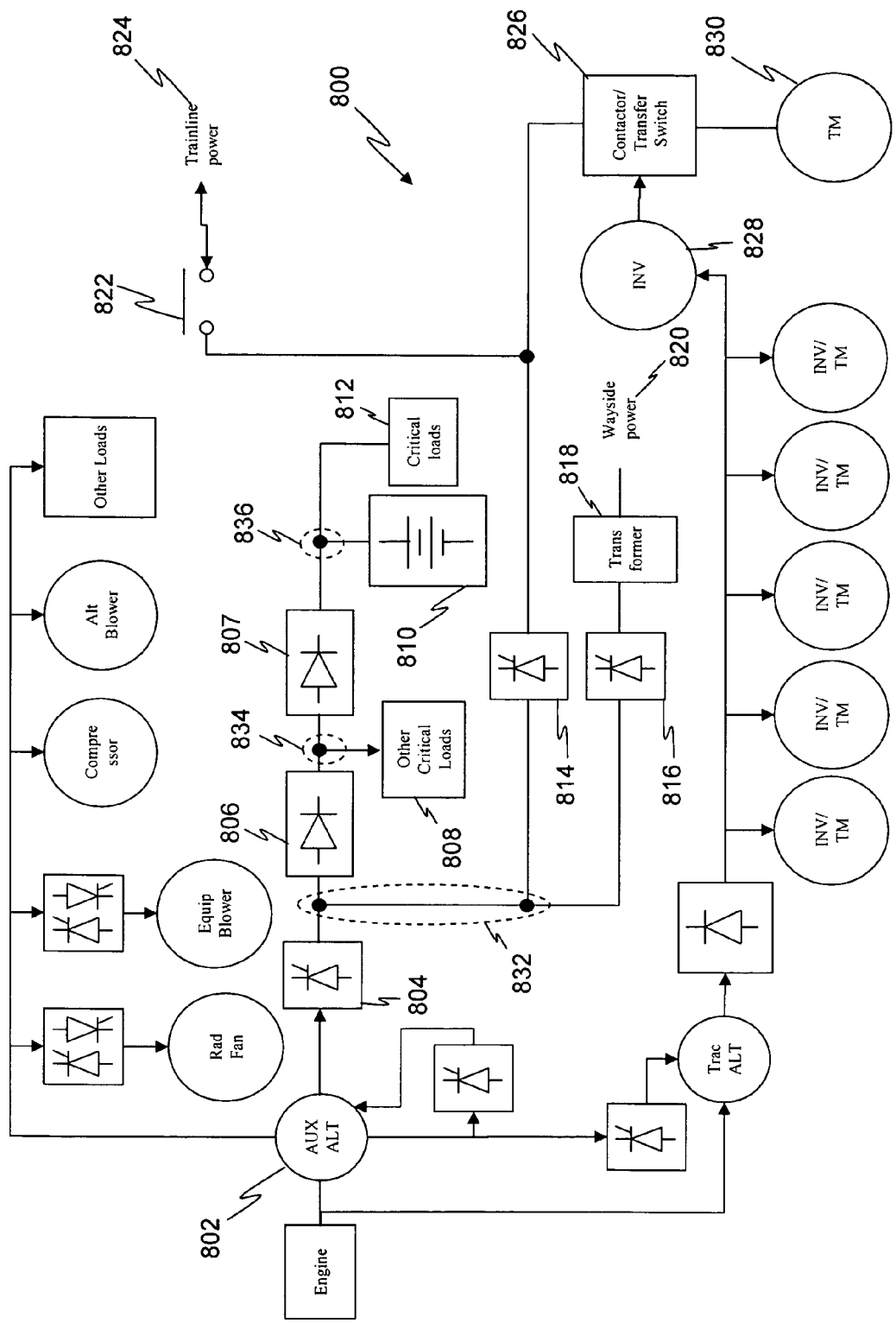
FIG. 13 is a schematic block diagram illustrating a locomotive electrical system configuration, in accordance with an eighth embodiment.

Referring to FIG. 13, a twelfth embodiment of a device 800 for allowing high current connections to be made to a locomotive's power carrying bus (Traction Inverter Backup) is shown and includes a first auxiliary power source 802, a first phase controlled rectifying device 804, a first diode 806, a second diode 807, a first critical load 808, a battery source 810, a second critical load 812, a second phase controlled rectifying device 814, a third phase controlled rectifying device 816, a transformer 818, a wayside power connection 820, a contactor device 822 communicated with a trainline power source 824 and a contactor/transfer switching device 826, wherein contactor/transfer switching device 826 is communicated with a traction inverter 828 and/or a traction motor 830. As shown, the auxiliary power source 802 is connected with the first phase controlled rectifying device 804 which is further communicated with the first diode 806, the second phase controlled rectifying device 814 and the third phase controlled rectifying device 816 via a first common node 832, wherein the first diode 806 is further communicated the second diode 807 and the first critical load 808 via a second common node 834. Moreover, the second diode 807 is connected with the battery source 810 and the second critical load 812 via a third common node 836. Additionally, the wayside power connection 820 is connected with the transformer 818 which is further communicated with the third phase controlled rectifying device 816. Moreover, the second phase controlled rectifying device 814 is further communicated with contactor device 822 and contactor/transfer switching device 826 via a fourth common node 838, wherein the contactor/transfer switching device 826 is further communicated with the traction inverter 828 and/or the traction motor 830.

FIG. 13 illustrates an inverter driven AC bus being provided to other locomotives and their associated critical loads via trainline power connection 824. Additionally, trainlining of power as described above may also be used. It should also be appreciated that with the device of FIG. 12, the typical limitation of the auxiliary source is no longer there and the traction system may provide sufficient power to a single or multiple locomotives.

Referring to FIG. 14, in a locomotive consist having a first locomotive and a second locomotive, wherein the first locomotive includes a first locomotive power source connected to a first locomotive electrical load and wherein the second locomotive includes a second locomotive power source connected to a second locomotive electrical load and wherein the first locomotive electrical load is electrically connected to the second locomotive electrical load via a train-line power bus, a method 900 for allowing the first locomotive to controllably and electrically interact with the second locomotive is provided and illustrated. The method 900 includes monitoring an operational characteristic of at least one of the first locomotive power source and the second locomotive power source to identify a malfunction of at least one of the first locomotive power source and the second locomotive power source, as shown in operational block 902. The method also includes monitoring the operational characteristic to identify a power requirement from at least one of the first locomotive electrical load and the second locomotive electrical load, as shown in operational block 904. If a malfunction of at least one of the first locomotive power source and the second locomotive power source is identified and a power requirement from at least one of the first locomotive electrical load and the second locomotive electrical is identified, then the method 900 includes controllably transferring power from at least one of the first locomotive power source and the second locomotive power source to at least one of the first locomotive electrical load and the second locomotive electrical via the train-line power carrying bus, as shown in operational block 906.

Although the first critical load 208, 308, 408, 508, 608, 708, 808 and the second critical load 212, 312, 412, 512, 612, 712, 812 are referred to herein as being singular loads, i.e. critical load, it should be appreciated that the first critical load 208, 308, 408, 508, 608, 708, 808 and/or the second critical load 212, 312, 412, 512, 612, 712, 812 may be single and/or multiple loading devices configured in any manner suitable to the desired end purpose, such as a series and/or a parallel configuration. Moreover, it should be appreciated that other embodiments of the invention as disclosed herein may be disposed in any arrangement suitable to the desired end purpose, wherein depending upon the selected arrangement some of the components may be optional. For example, referring to the figures, diodes 207, 211, 307, 406, 506, 606, 698, 706 and 806 may be optional. Moreover, elements 518 and 714 may be diode rectifiers if the voltage may be regulated by other means, such as elements 524 and 724.

It should be appreciated that devices 200, 300, 400, 500, 600, 700 and 800 illustrate a way to provide an alternative power source to an AC locomotive's critical load(s) initially provided from the locomotive's battery bus. The alternative power source may be any locomotive AC source and/or a DC traction source provided either directly and/or from another locomotive via a trainline connection. It should be further appreciated that a single or multiple phase controlled rectifying device(s) may be used in place of first phase controlled rectifying device, second phase controlled rectifying device and/or third controlled rectifying device as long as switching capability is provided for the input of the controllers. It should be further appreciated that instead of using phase controlled rectifiers, other power electronics topologies like rectifiers/choppers/converters may be used. Moreover, various transformer/filter devices may be used for providing ground isolation and/or power factor improvement/correction/conditioning of AC source(s).

Furthermore, devices 200, 300, 400, 500, 600, 600, 700, 800 for allowing high current connections to be made to a locomotive's power carrying bus as discussed hereinabove may be implemented, in whole or in part, using a set of common and/or custom connection devices and cables at any suitable location within a locomotive, such as at either end of a locomotive, wherein the connection devices and/or cables are capable of allowing high current connections to be made to any of the locomotive's power carrying bus, including, but not limited to, the battery excitation (battery charger output) bus, the auxiliary power bus and/or a DC battery bus. It should be appreciated that although the embodiments disclosed herein are illustrative of critical loads being DC loads, this invention is not limited to DC loads, but is applicable to both DC and AC loads.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. In a locomotive having at least one electrical load connected to at least one power source via a locomotive power carrying bus, a system for ensuring a current connection between the at least one power source and the at least one electrical load, the system comprising:

a first rectification device, wherein said first rectification device is connected between the at least one electrical load and the locomotive power carrying bus to provide a current connection between a first power source and the at least one electrical load;

a second rectification device, wherein said second rectification device is connected between the at least one electrical load and the locomotive power carrying bus to provide a rectified current connection between a second power source and the at least one electrical load; and at least one auxiliary rectification device, wherein said at least one auxiliary rectification device is connected to the at least one electrical load and at least one of said first rectification device and said second rectification device to ensure a continuous current connection between the at least one power source and the at least one electrical load;

wherein the at least one electrical load is further connected to a train-line power bus, wherein when the locomotive is part of a locomotive consist having at least one additional locomotive connected to the locomotive via said train-line power bus, the at least one electrical load is electrically connected to said at least one additional locomotive via said train-line power bus to at least one of draw power from and supply power to said at least one additional locomotive; and wherein the at least one electrical load is connected to said train-line power bus via at least one of a diode and a switching device, wherein if the at least one electrical load is connected to said train-line power bus via said diode and said switching device, said diode and said switching device are electrically arranged to be in parallel with each other.

2. In a locomotive consist having at least two locomotives electrically connected via a train-line power bus, wherein each of the two locomotives includes a locomotive power carrying bus and at least one electrical load connected to at least one power source via at least one current rectification device connected to the locomotive power carrying bus, a system for ensuring a rectified current connection between the at least one power source and the at least one electrical load, the system comprising:

a first rectification device, wherein said first rectification device is connected between the at least one electrical load and the locomotive power carrying bus to provide a rectified current connection between a first power source and the at least one electrical load;

a second rectification device, wherein said second rectification device is connected between the at least one electrical load and the locomotive power carrying bus to provide a rectified current connection between a second power source and the at least one electrical load; and at least one auxiliary rectification device, wherein said at least one auxiliary rectification device is connected to the at least one electrical load and at least one of said first rectification device and said second rectification device to ensure a rectified current connection between the at least one power source and the at least one electrical load;

wherein the at least one electrical load is connected to the train-line power bus via at least one of a diode and a switching device, wherein when the at least one electrical load is connected to the train-line power bus via said diode and said switching device, said diode and said switching device are electrically arranged to be in parallel with each other.

3. In a locomotive consist having a first locomotive and a second locomotive, wherein the first locomotive includes a first locomotive power source connected to a first locomotive electrical load and wherein the second locomotive includes a second locomotive power source connected to a second locomotive electrical load and wherein the first locomotive electrical load is electrically connected to the second locomotive electrical load via a train-line power bus, a method for allowing the first locomotive to controllably and electrically interact with the second locomotive, the method comprising:

monitoring an operational characteristic of at least one of the first locomotive power source and the second locomotive power source to identify a malfunction of at least one of the first locomotive power source and the second locomotive power source and to identify a power requirement from at least one of the first locomotive electrical load and the second locomotive electrical load; and if a malfunction of at least one of the first locomotive power source and the second locomotive power source is identified and a power requirement from at least one of the first locomotive electrical load and the second locomotive electrical is identified, controllably transferring power from at least one of the first locomotive power source and the second locomotive power source to at least one of the first locomotive electrical load and the second locomotive electrical load via the train-line power carrying bus.

4. The method of claim 3, wherein at least one of the first locomotive electrical load and the second locomotive electrical load is connected to the train-line power bus via at least one of a diode and a switching device, wherein when the at least one of the first locomotive electrical load and the second locomotive electrical load is connected to the train-line power bus via said diode and said switching device, said diode and said switching device are electrically arranged to be in parallel with each other.

* * * * *